US012567971B2

(12) United States Patent
Seniuk et al.

(10) Patent No.: US 12,567,971 B2
(45) Date of Patent: Mar. 3, 2026

(54) ENTERPRISE AUTHENTICATION WITH VIRTUALIZED TPM

(71) Applicant: Imprivata, Inc., Waltham, MA (US)

(72) Inventors: Victoria Seniuk, Lviv (UA); Boris Boruchovich, Carlisle, MA (US); Rostislav Samoulyk, Lypivka (UA); William Hann, St. Augustine, FL (US); Henry E. Walsh, Stow, MA (US); Niteen Borge, Westford, MA (US); Andrew Harrison, Newport (GB)

(73) Assignee: IMPRIVATA, INC., Waltham, MA (US)

( * ) Notice: Subject to any disclaimer, the term of this patent is extended or adjusted under 35 U.S.C. 154(b) by 36 days.

(21) Appl. No.: 18/787,993

(22) Filed: Jul. 29, 2024

(65) Prior Publication Data

US 2025/0310111 A1 Oct. 2, 2025

Related U.S. Application Data

(60) Provisional application No. 63/570,756, filed on Mar. 27, 2024.

(51) Int. Cl.
*H04L 9/32* (2006.01)
(52) U.S. Cl.
CPC .......... *H04L 9/3234* (2013.01); *H04L 9/3271* (2013.01)
(58) Field of Classification Search
CPC ... H04L 9/3234; H04L 9/3271; H04L 9/3247; H04L 9/0897; G06F 2009/45587
See application file for complete search history.

(56) References Cited

U.S. PATENT DOCUMENTS

2022/0391512 A1   12/2022   Sethi et al.
2023/0267214 A1*   8/2023   Zhang ...................... H04L 9/14
                                        713/189

FOREIGN PATENT DOCUMENTS

CN        103701607 A        4/2014
CN        111310173 A        6/2020

OTHER PUBLICATIONS

Extended European Search Report of Application No. 24191591.7, dated Dec. 20, 2024.

* cited by examiner

*Primary Examiner* — Izunna Okeke
(74) *Attorney, Agent, or Firm* — Morgan, Lewis & Bockius LLP

(57) ABSTRACT

Disclosed is a system and method for enterprise authentication. An enterprise cluster includes one or more enterprise appliances employing virtual machines managed by at least one hypervisor. Each virtual machine is associated with a respective virtual Trusted Platform Module (vTPM) secured by the hypervisor. An enterprise key (EK) is provided to the appliances of the enterprise cluster and imported into a vTPM associated with each appliance. When a user authentication request is received by a first appliance, the first appliance obtains a user encrypted key which was previously encrypted by a different vTPM on a different appliance with the same EK. The vTPM then signs a challenge based on decrypting the user encrypted key with the EK, completing the user authentication request.

19 Claims, 4 Drawing Sheets

┌─── 300

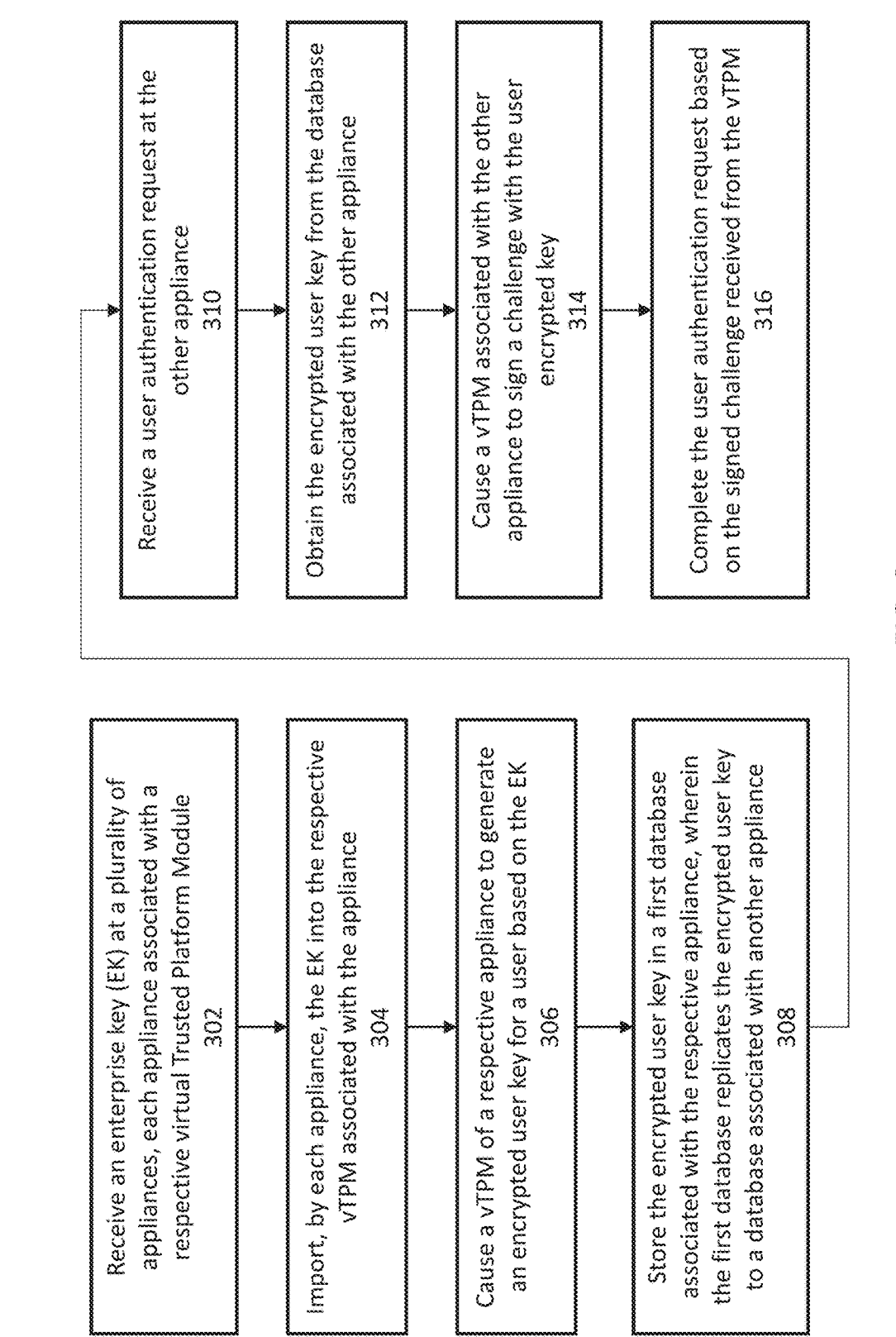

300

Receive an enterprise key (EK) at a plurality of appliances, each appliance associated with a respective virtual Trusted Platform Module
302

Import, by each appliance, the EK into the respective vTPM associated with the appliance
304

Cause a vTPM of a respective appliance to generate an encrypted user key for a user based on the EK
306

Store the encrypted user key in a first database associated with the respective appliance, wherein the first database replicates the encrypted user key to a database associated with another appliance
308

Receive a user authentication request at the other appliance
310

Obtain the encrypted user key from the database associated with the other appliance
312

Cause a vTPM associated with the other appliance to sign a challenge with the user encrypted key
314

Complete the user authentication request based on the signed challenge received from the vTPM
316

FIG. 3

ENTERPRISE AUTHENTICATION WITH VIRTUALIZED TPM

CROSS-REFERENCE TO RELATED APPLICATION

This application claims the benefit of U.S. Provisional Application No. 63/570,756, filed on Mar. 27, 2024, the entirety of which is incorporated herein by reference for all purposes.

TECHNICAL FIELD

The present disclosure is generally related to enterprise level authentication and encryption.

BACKGROUND

Enterprise server clusters have embraced virtualization technologies, leveraging virtual machines (VMs) and hypervisors to enhance resource utilization and streamline session management for a large amount of users. VMs, operating as isolated instances on a single physical server, enable the concurrent execution of multiple workloads. Hypervisors, including Virtual Machine Monitors (VMMs), abstract and manage hardware resources, allocating CPU, memory, and storage among VMs within a server cluster. Together, these components optimize resource usage, improve scalability, and contribute to the overall agility of data center operations.

The security of virtualized environments within server clusters has led companies to integrate Trusted Platform Modules (TPMs). TPMs have played a critical role in securing the boot process of both hypervisors and VMs. By storing cryptographic measurements, TPMs ensure the execution of trusted and unaltered code during system initialization, preventing unauthorized modifications and enhancing overall system integrity. TPMs also provide secure key storage for cryptographic keys, strengthening the security of sensitive data within the server environment and protecting against unauthorized access.

SUMMARY

According to various aspects, a method includes receiving an enterprise key (EK) at a first appliance of a plurality of appliances; importing the EK into a virtual Trusted Platform Module (vTPM) associated with the first appliance; receiving, by the first appliance, after importing the EK, a user authentication request associated with a user; receiving, by the first appliance, a user encrypted key associated with the user, the user encrypted key being previously encrypted based on the EK by a vTPM associated with a second appliance of the plurality of appliances; causing the vTPM associated with the first appliance to sign a challenge based on decrypting the user encrypted key with the EK imported into the vTPM associated with the first appliance; receiving the signed challenge from the vTPM associated with the first appliance; and completing the user authentication request based on the signed challenge received from the vTPM associated with the first appliance.

In some implementations, the method further comprises, by the second appliance before the user encrypted key is received by the first appliance: receiving the EK at the second appliance; importing the EK into a vTPM associated with the second appliance; causing the vTPM associated with the second appliance to generate the encrypted user key for the user based on the EK imported into the vTPM associated with the second appliance; and storing the encrypted user key in a database associated with the second appliance, wherein the database replicates the encrypted user key to a database associated with the first appliance. Other aspects include corresponding systems, apparatus (e.g., an infusion device), and computer program products for implementation of the corresponding method and its features.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For a better understanding of the various described implementations, reference should be made to the Description of Implementations below, in conjunction with the following drawings. Like reference numerals refer to corresponding parts throughout the figures and description.

FIG. 3 depicts an example process flow diagram for implementing enterprise level authentication using vTPMs, according to aspects of the subject technology.

DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Disclosed herein is a system and method for enterprise authentication. An enterprise cluster includes one or more enterprise appliances employing virtual machines managed by at least one hypervisor. Each virtual machine is associated with a respective virtual Trusted Platform Module (vTPM) secured by the hypervisor. An enterprise key (EK) is provided to each appliance in the enterprise cluster and imported into a vTPM associated with the appliance. When a user authentication request is received by a first appliance, the first appliance obtains, from a database, a user encrypted key which was previously encrypted by a different vTPM on a different appliance with the same EK. The vTPM then signs a challenge based on decrypting the user encrypted key with the EK, and the user authentication request is completed based on the signed challenge.

Figure 1:
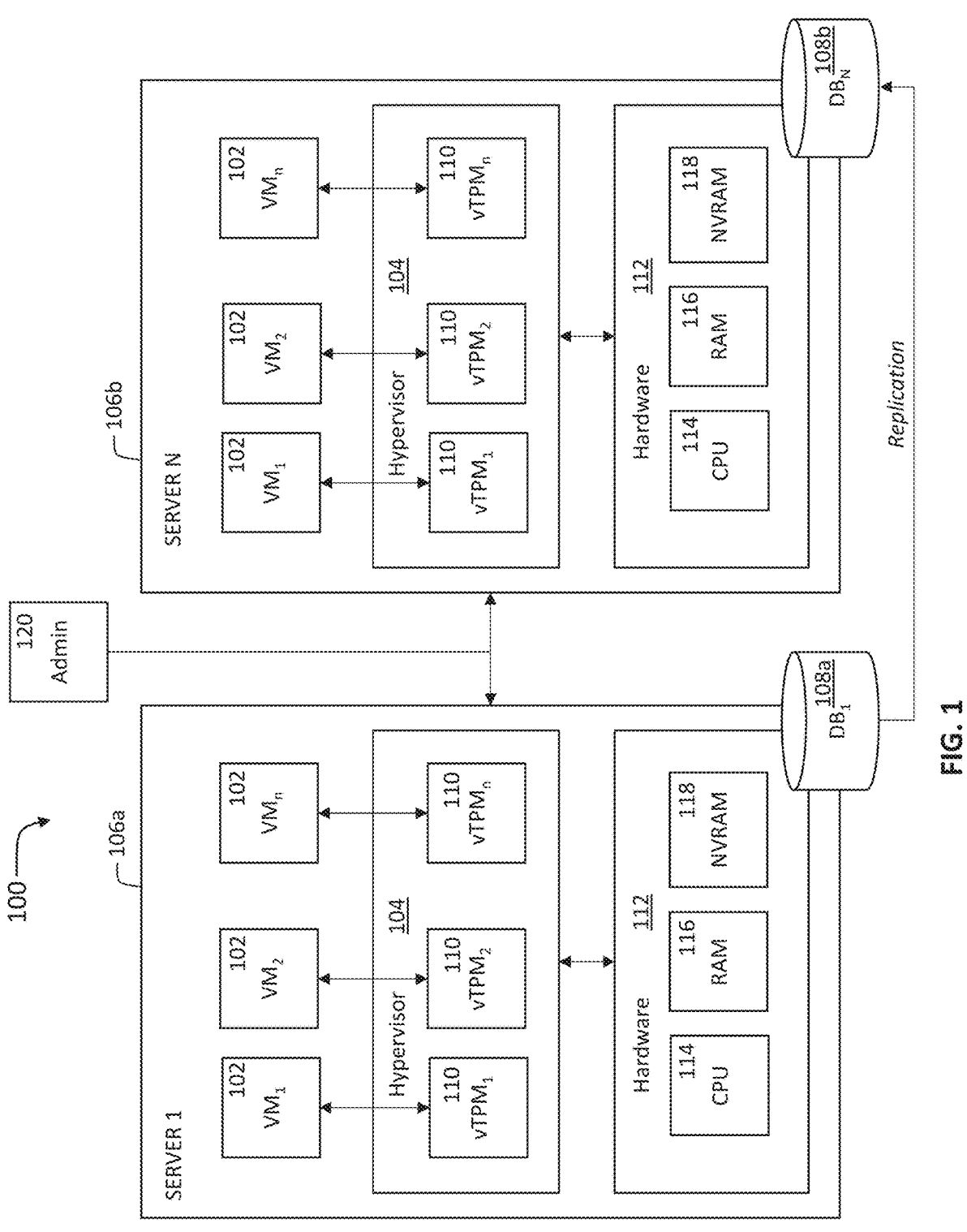
FIG. 1 depicts a block diagram of an example system for implementing enterprise level authentication using virtual trusted platform modules (vTPMs), according to aspects of the subject technology.

FIG. 1 depicts a block diagram of an example virtualization system 100 for implementing enterprise level authentication using virtual trusted platform modules (TPMs), according to aspects of the subject technology.

In contemporary enterprise computing, the utilization of virtual machines (VMs) 102 and hypervisors 104 within server clusters has become instrumental for optimizing resource utilization, enhancing scalability, and facilitating streamlined management of computing resources. According to various implementations, VMs operate as isolated instances, each encapsulating its own operating system (OS) and applications, thereby enabling the concurrent execution of multiple workloads on a single physical server 106. This approach allows for efficient resource utilization, improved scalability, and simplified management within enterprise server clusters.

A hypervisor 104, also known as a Virtual Machine Monitor (VMM), is a software layer that sits between the hardware and the virtual machines (VMs) and manages the underlying hardware resources within a server cluster. The hypervisor 104 allocates CPU, memory, storage, and network resources among the VMs 102, ensuring optimal usage and preventing resource contention. The hypervisor 104 oversees the lifecycle management of the VMs 102, and provides mechanisms for creating, starting, stopping, and migrating VMs 102, thereby facilitating dynamic workload management and high availability. The hypervisor 104 further manages the allocation and sharing of physical resources among multiple VMs 102. The relationship between VMs 102 and hypervisors 104 enables enterprises to create flexible, isolated, and efficient computing environments within server clusters.

One function of the hypervisor 104 is to provide isolation between VMs 102. Each VM 102 operates as an independent and isolated instance with its own dedicated resources, including virtual CPU, memory, and storage. This isolation ensures that activities within one VM 102 do not impact others, enhancing security and stability. Moreover, the hypervisor 104 implements security features to protect VMs 102 from unauthorized access and ensure compliance with security policies. This includes features such as secure boot, encryption, and access controls. While the depicted example includes one hypervisor, it is understood that each server may include more than one hypervisor (e.g., a first and second and/or third hypervisor, etc.), with each hypervisor managing resources for one or more VMs.

In the depicted example, one or more servers (or appliance) 106 host the virtualization system 100. Each server 106 may be part of a server cluster, which may then leverage the VMs 102 to enhance resource utilization, scalability, and management. In some implementations, the VMs 102 may be deployed to host different components of a web application, such as web servers, application servers, and database servers, allowing for efficient scaling based on web traffic demands. The system 100 may implement one or more load balancers (not shown) to distribute incoming requests among the VMs 102 to ensure high availability and responsiveness.

In some implementations, the VMs 102 are employed in clusters, some or all of which may be dedicated to application hosting. Each VM may run, for example, a specific application or service, and the cluster can dynamically scale by adding or removing VM instances based on demand. In some implementations, one or more VMs 102 may be used to isolate database instances. In this regard, each VM 102 may run a separate database server, enabling efficient resource allocation and isolation.

Each server may include or be associated with a database 108, which serves as a data repository for a portion of, or all of, the enterprise system. According to various aspects, the database 108 stores and manages structured and unstructured data generated and consumed by various applications and services running on the VMs 102. Access to the database may be facilitated through secure and optimized communication channels established by the VMs. As depicted in FIG. 1, each database (e.g., 108a) may be configured to replicate to other databases (e.g., 108b) in the overall enterprise system. In some implementations, duplicate copies of a database 108 are created and maintained across multiple VMs in the cluster. Moreover, each VM 102 hosting a replicated database may operate as a node contributing to the overall performance of the database system. The hypervisor 104 ensures that changes made to a master database are captured and replicated to one or more replica databases running on separate VMs. The replication process can involve, for example, sending transaction logs or data changes from a master to the replica databases.

According to various implementations, the virtualization system 100 includes virtualized Trusted Platform Modules (vTPMs) 110 exposed by a hypervisor 104 to VMs 102 in the host server. A vTPM 110 is a software-based implementation of the Trusted Platform Module (TPM) functionality. A traditional TPM is a hardware component that provides a secure platform for cryptographic operations, secure storage of keys, and measurement of system integrity. It is commonly found as a dedicated chip on the motherboard of a computing device. On the other hand, a vTPM replicates the functionalities of a physical TPM using software, without requiring additional hardware. It emulates the behavior of a TPM within a virtualized environment, typically in the context of virtual machines (VMs) hosted by a hypervisor.

Each vTPM 110 is generated by the hypervisor 104 and provided to the VMs 102 by the hypervisor 104. In this regard, the vTPM benefits from the security features of the hypervisor. This also allows VMs to benefit from TPM-related features even when the underlying physical hardware layer 112 of the server lacks a dedicated TPM. In the depicted example, hardware layer 112 includes a CPU 114, RAM 116, and NVRAM 118, while other components and/or implementations of the hardware layer 112 are further described with respect to FIG. 4. The TPM logic (e.g., object code) of each vTPM 110 is generated for the corresponding VM 102 by the hypervisor and stored in RAM 116, while the cryptographic data of the vTPM is stored as an encrypted file in the NVRAM 118. The file may be encrypted by a key management system.

Each vTPM 110 emulates the cryptographic operations and security functions provided by a physical TPM. This includes functionalities such as key generation, storage, and attestation. Like a physical TPM, a vTPM 110 enables the secure storage of cryptographic keys. These functions provide the VMs 102 and associated applications a secure environment for key management, such as encryption or digital signatures.

Accordingly, each vTPM 110 may be uniquely tied to each VM 102, so every virtual machine (and thus each server) in the cluster has its own vTPM. In a hardware only model, hardware limitations create impediments to sharing a TPM across a large number of VMs for a multitude of user sessions. Moreover, in a hardware only model, only the TPM that was able to encrypt the piece of data (e.g., in the database) can decrypt it. That is, if the data from one VM is synchronized to another VM (or server), the other VM (or server) will not be able to read the data due to the encryption by the prior TPM (or vTPM). The subject technology solves this problem by tying all vTPMs to a single enterprise key using a three key hierarchy.

The subject technology initializes each vTPM 110 in the cluster with a global enterprise key, which can be uploaded/ imported to each vTPM by an administrative console 120 (e.g., on the same or a different server). In some implementations, once the enterprise key is imported to a vTPM, it cannot be exported; it stays there-it's the same on every machine. The enterprise key is protected (e.g., encrypted) by a primary key within the vTPM that is unique to each vTPM and inaccessible to the VMs 102 (and even the hypervisor 104). The protected enterprise key stored in each vTPM may then be used during the challenge process to generate and then authenticate user keys (encrypted user smart cards) as a user traverses the enterprise. In this regard, the vTPM creates an encrypted user key (smart card) that is encrypted within the vTPM (using the enterprise key), returned to the appliance as encrypted data, and then stored in the database 108. Because the encryption mechanisms stay entirely within the vTPM, the entire encryption process of the user key is protected. The encrypted user key may then be replicated to each database across the enterprise as needed (e.g., thousands of user keys for a user may be created and stored). When a request comes in to decrypt the user key, any one of the servers and/or VMs in the cluster can perform the decryption because, due to the common initialization of each vTPM, the user key is common intermedia to the enterprise. In this manner, the subject technology utilizes the vTPM of each VM to solve the problem of enterprise authentication across all servers and/or VMs in an enterprise cluster.

Figure 2:
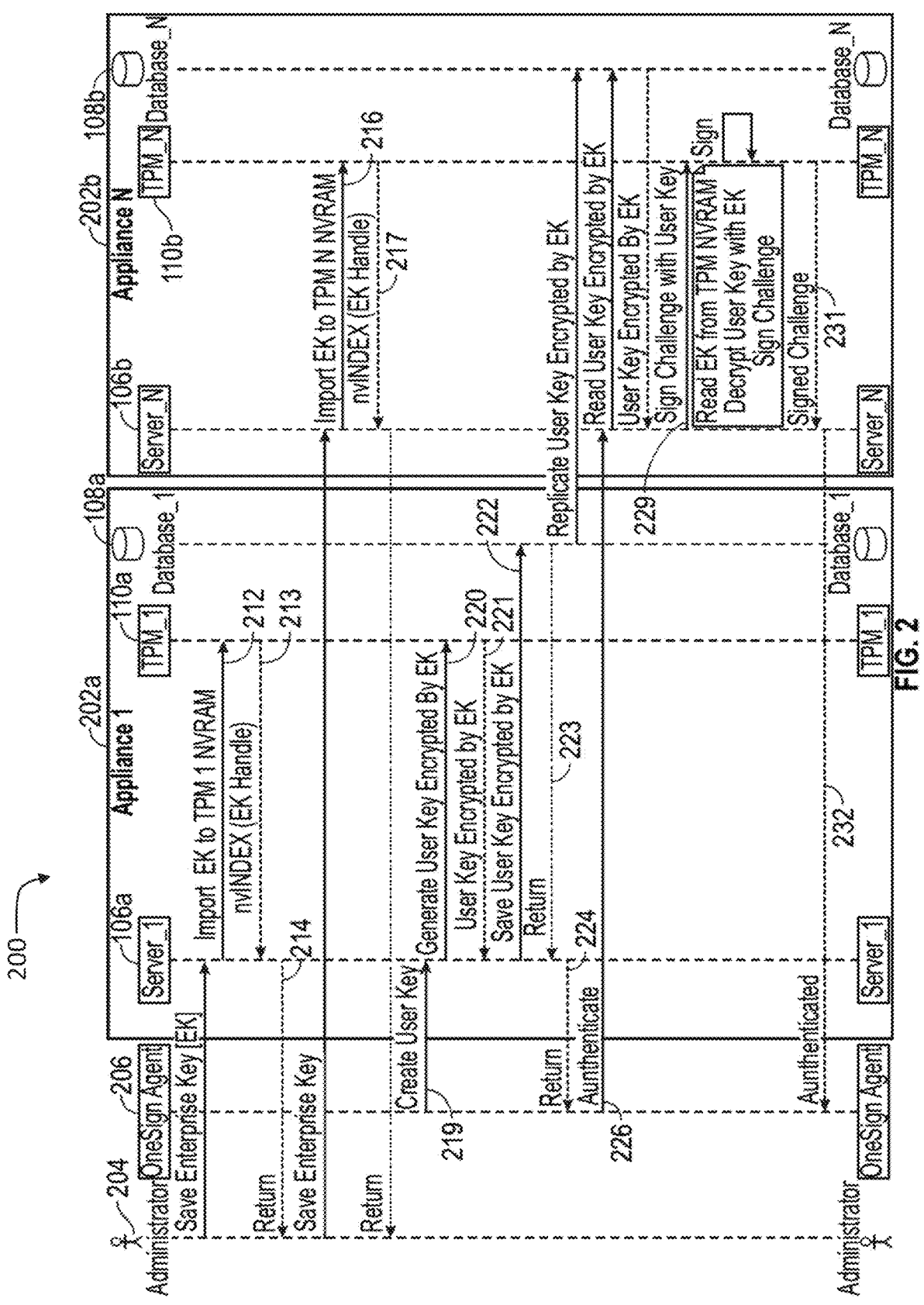
FIG. 2 depicts a sequence diagram of an example process for implementing enterprise level authentication using vTPMs, according to aspects of the subject technology.

FIG. 2 depicts a sequence diagram of an example process for implementing enterprise level authentication using vTPMs, according to aspects of the subject technology. The system 200 of FIG. 2 depicts an interaction between two enterprise appliances 202a, 202b. Generally, an "appliance" may be interpreted to mean either a server or a VM, or particular group of servers and/or VMs. Each VM may be managed by a hypervisor 104 (e.g., on a server), and the hypervisor may oversee the lifecycle management of one VM or multiple VMs. Accordingly, a server may include multiple hypervisors, each managing a single VM or multiple VMs. In some implementations, each appliance may include one or more servers 106, one or more VMs 102, one or more vTPMs 110, and at least one database 108.

For the purpose of the depicted example process of FIG. 2, the term appliance includes a VM 102 and its corresponding vTPM 110, as described in FIG. 1, along with the server 106 and database 108 associated with the VM and vTPM. In this regard, calls to and from the server may be interpreted to be via a VM. The server 106 and database 108 may be applicable to multiple appliances (e.g., VMs and vTPMs) but are described collectively for the purpose of describing the full functionality of the particular appliance in the example.

The system of FIG. 2 further depicts an administrator 204, which may include the administrative console 120 of FIG. 1. The system is further shown as including an agent 206. The agent may include, for example, any agent in a user authentication process, including, for example, a component within a single sign-on (SSO) system that facilitates the seamless authentication and authorization of users across multiple applications or services, whereby the user logs in one time and gains access to various systems without the need to re-enter credentials for each application.

The agent 206 may be a software component that facilitates the integration of SSO. For example, the agent may be integrated with one or more web servers or web applications, an identity provider (e.g., LDAP, OAuth provider, SAML provider, and the like), as a middleware or API gateway, integrated with cloud services and applications, in a mobile or desktop application, in a network appliance, and the like. In some implementations, the agent may include, for example, a computing device associated with a user or an application, a computing device managing a user or application transaction (e.g., between the user's browser and a website), a web browser, web or network-enabled application, authentication logic on the server or user's computing device, or other device or logic configured to initiate and/or maintain authentication in a web or network-enabled computing environment.

According to various implementations described herein, the administrator (e.g., via an administrative console 120) uploads an enterprise key (EK) to a first appliance 202a in the enterprise (211). The receiving appliance 202a (e.g., at Server 1) imports the EK into a vTPM 110a (212). According to various implementations, the vTPM 110a may be associated with a receiving VM of the first appliance. The vTPM 110a protects the EK with its primary key and saves the EK to the NVRAM 118 associated with the vTPM 110a. The vTPM 110a returns an index (or handle) associated with the stored EK to the calling appliance 202a (213), which may then be returned by the appliance to the administrator (214), as shown. The index indicates a memory location within the vTPM (e.g., in NVRAM) of the (protected) EK in memory. The index may then be stored by the server and/or administrator for future operations pertaining to the EK (e.g., deletion of the key). According to various implementations, the EK is only stored in vTPMs (e.g., in NVRAM 118 on the server, but not in the database 108a or 108b). In this regard, while a potential attacker may understand that the EK is stored by the vTPM, the attacker is not able to use it without access to the vTPM, which is protected by the security of the respective hypervisor 104 managing the vTPM.

The foregoing importing of the EK into the vTPM may be repeated for each VM in the server (and corresponding vTPM), and repeated for each vTPM of each server in the enterprise. For example, in the depicted sequence diagram, the uploading of the enterprise key is repeated for a second appliance (and/or VM) in the enterprise (215-218). This process may be performed during an initial setup of the enterprise (e.g., before the servers are live).

During an enrollment process, a public and private key are generated for the enrolling entity (e.g., for a person, application, or computer device), which will later facilitate secure authentication across the enterprise. In this regard, the appliance 202a receives a request from the agent 122 to generate a virtual Smart Key (vSC) for the user (an encrypted user key) (219). The server (or receiving VM) instructs a respective vTPM to generate the vSC using the private key generated during the enrollment process, and the vTPM generates a vSC for the user, which is encrypted/ protected by the enterprise key stored within that vTPM. In other words, the enterprise key is a parent key for the vSC. The vTPM returns the vSC object to the server (221).

According to various implementations, since each vTPM operates within and is protected by hypervisor security, the vSC object is generated within the hypervisor, which then provides it securely back to the corresponding VM. The server and/or VM then stores the encrypted vSC (the private key generated during the enrollment process, now encrypted with the enterprise key) in the database 108a associated with the appliance 202a (222). In various implementations, the vSC is stored in each database 108 by marshaling data from the vSC object to a binary buffer. In this regard, the vTPM may generate a virtually unlimited number of keys for use but not waste valuable internal storage (e.g., within the NVRAM). The database 108a returns a notification to the server 106a and/or VM when the storage is successful (223), and the process of creating the vSC completes by the server and/or VM providing a notification to the agent that the vSC was created (224). The previously generated public key may be stored in connection with the user account created during the enrollment process. For example, the public key may be associated with a user identifier (e.g., a user ID for a person, application, or computer device) in an authentication database or at an identity provider (e.g., LDAP, OAuth provider, SAML provider, or the like), or in a database associated with a middleware or API gateway, integrated with cloud services and/or applications, in a mobile or desktop application, in a network appliance, and the like. In this regard, the public key is accessible (e.g., using the user ID) by the agent 206 or other authentication requester during the authentication process.

Once stored in the database 108a of a first appliance 202a, the database may replicate the vSC to other databases within the enterprise cluster (225). In this regard, the vSC keys are spread across the enterprise, with each copy protected by the enterprise key. Again, since the vTPM handles the encryption internally (e.g., based on the enterprise key), nothing can spy on the encryption process. The vTPM returns a binary large object (BLOB), which is useless to any potential attacker without access to the internal encryption process within the vTPM. As described previously, the BLOB is stored in the database 108 and synchronized with other appliances.

Once the user's vSC has been created and replicated across the enterprise (via the databases 108), when an authentication process is later initiated for a user account (e.g., for a person, application, or computing device), each appliance can now decrypt the vSC because each appliance was initialized with and has the same enterprise key. When a user authenticates to a second appliance 202b, the corresponding agent 206 sends an authentication request to the second appliance (226). For example, the agent 206 may send the authentication request to a second server 106b via a VM on that server. When the request is received, the second appliance 202b (e.g., the second server and/or VM) reads the vSC associated with the user account (e.g., linked to the authentication request) from the database 108b associated with the second appliance (227). The vSC is returned to the calling server 106b by the database (228) and the server 106b and/or VM makes a request to it's vTMP 110b to sign a challenge with the vSC. In this regard, the appliance imports/loads the vSC into the vTMP along with the challenge and instructs the vTMP to sign the challenge with the vSC (229).

Internally, the vTMP 110b reads the enterprise key from a location of memory within the NVRAM 118 associated with the vTMP 110b, decrypts the vSC with the enterprise key (validating the vSC), and signs the given challenge (230), indicating that the vSC was valid. All operations are internal to the vTPM (in the virtual chip, in the hypervisor) and thus protected by way of being in the hypervisor 104 (using the hypervisor's own security levels and security processes). The vTPM then returns a response including the signed challenge to the appliance (231). The requester verifies the response using the public key associated with the account's private key (protected as the vSC) and, if the verification is successful, then the authentication process to the second appliance is complete (232).

FIG. 3 depicts an example process flow diagram for implementing enterprise level authentication using vTPMs, according to aspects of the subject technology. For explanatory purposes, the various blocks of example process 300 are described herein with reference to FIGS. 1 and 2, and the components and/or processes described herein. One or more of the blocks of process 300 may be implemented, for example, by one or more servers 106, VM(s) 102, vTPM(s) 110, and/or hypervisors 104. In some implementations, one or more of the blocks may be implemented apart from other blocks, and by one or more different processors (including virtual processors) or devices. Further for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

In the depicted example, an enterprise key (EK) is received at a plurality of appliances (302). For purposes of discussion, the plurality of appliances may include, for example, an enterprise cluster of servers. The EK may be received by one or more servers in the cluster from an administration interface 120 remote from each server. The administration interface may be, for example, part of a server responsible for management of the servers/appliances in the cluster, which may reside in the cluster or be remote from those servers/appliances. An administrator (having appropriate privileges) may access the interface 120 to upload the EK to the appliances when the enterprise is initialized.

As described previously, each appliance may be associated with a respective virtual Trusted Platform Module (vTPM), with each respective vTPM 110 executing as software logic in a protected random-access memory 116, while storing encrypted data in an encrypted file on a secure non-volatile memory 118 associated with a hypervisor 104. Each appliance of the plurality of appliances may include one or more virtual machines (VMs) 102 running concurrently on a server computer, with each VM being associated with a respective vTPM 110. Each vTPM 110 may, for example, execute in a protected memory space of a hypervisor 104 associated with a corresponding VM 102. In this regard, the user encrypted key received at the first appliance 202a may be received via a VM of the first appliance 202a.

Each appliance imports the EK into the respective vTPM associated with the appliance (304). According to various implementations, when the EK is received by an appliance, the EK is imported (e.g., via a VM) into a vTPM associated with that appliance. The relevant vTPM stores the EK in non-volatile memory 118 associated with the TPM, which may be in a secure memory area protected by hypervisor security. Once imported, the appliance may receive from the vTPM, an index to the EK, for example, identifying an address space of the vTPM associated with storing the EK for the appliance.

A vTPM of a respective appliance is caused to generate an encrypted user key for a user based on the EK (306). As described previously, a request to generate the encrypted user key for the user may be received by the appliance in connection with an enrollment process initiated by the user (e.g., when a user account is created). In some implementations, the request may originate from an agent 206, for example, as part of an enrollment process or as part of an authentication process (e.g., when the user first submits credentials). In some implementations, the request may originate from the administration interface 120 on behalf of a user.

The vTPM of the respective appliance generates the encrypted user key based on the EK it had received and stored previously. As described previously, during the enrollment process, a public-private key pair may be generated and the private key imported to the vTPM to create the encrypted user key. If initiated by the agent 206, the vTPM (e.g., via the VM) may notify the agent that the encrypted user key was created. The public key may be stored in connection with the user account in an authentication database or an identity provider/identity management system.

The encrypted user key is then stored in a database associated with the respective appliance (308). As described previously, the database may be configured to replicate the encrypted user key to another database associated with one or more other appliances. In this regard, the databases may ensure that all the appliances in the enterprise have access to the encrypted user key. In some implementations, the encrypted user key may be indexed in each database by a unique identifier associated with the user account (e.g., an identifier associated with the current user session, user, or device requesting the authentication).

A user authentication request is received at the other appliance (310). For example, the user may be seeking to authenticate to the other appliance in a first instance or may have navigated to the other appliance as part of a single sign-on process. According to various implementations, the encrypted user key is obtained from the database (312) associated with the other appliance, which has already received the encrypted user key via the replication process.

The other appliance then attempts to authenticate the user using an authentication challenge. Accordingly, a vTPM associated with the other appliance is caused to sign the challenge with the user encrypted key (314). As described previously, the vTPM signs the challenge based on (internally) decrypting the user encrypted key using the previously imported EK, and returns the signed challenge to the other appliance. The user authentication request is then completed when the signed challenge received from the vTPM is verified with the public key (316).

Many of the above-described example steps of process 300, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
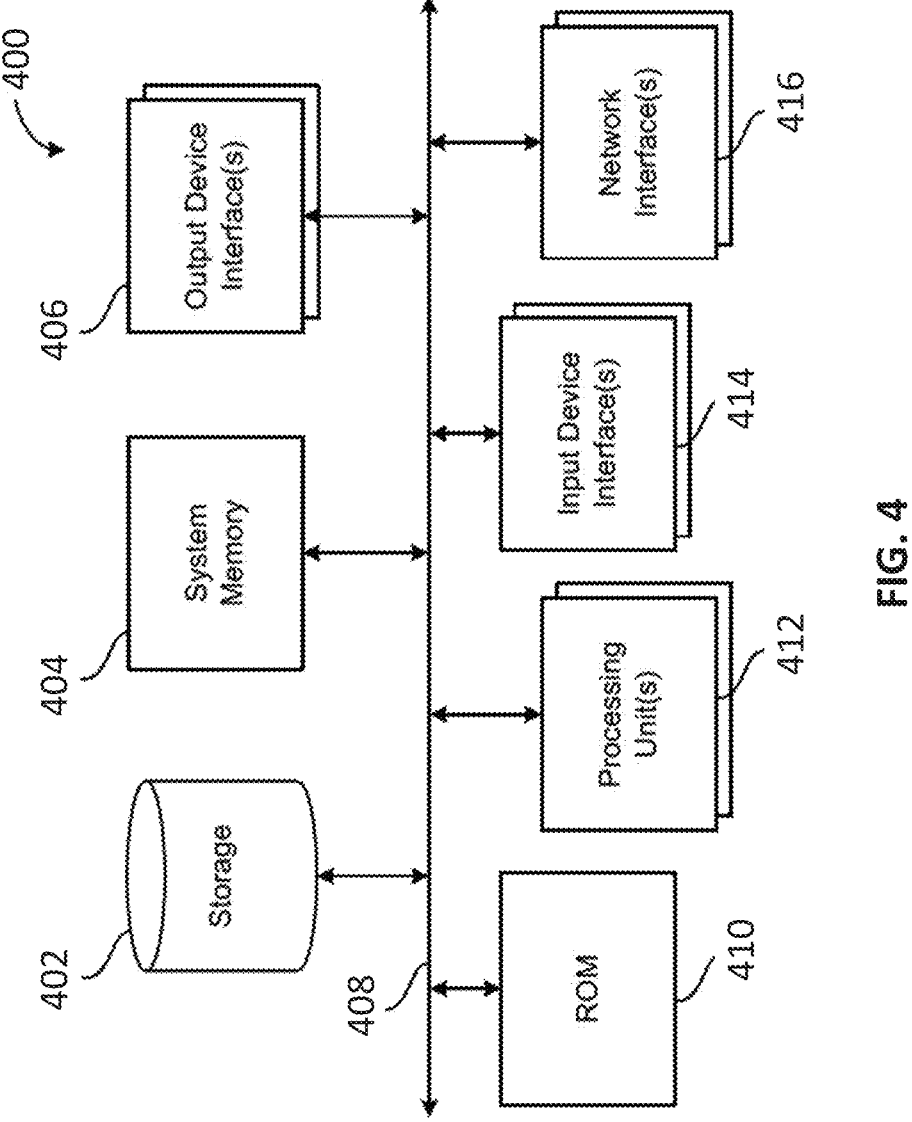
FIG. 4 is a conceptual diagram illustrating an example electronic system for implementing enterprise level authentication using vTPMs, according to aspects of the subject technology.

FIG. 4 is a conceptual diagram illustrating an example electronic system for implementing enterprise level authentication using vTPMs, according to aspects of the subject technology. Electronic system 400 may be a specifically configured computing device for execution of software associated with one or more portions or steps of process 400, or components and processes provided by FIGS. 1 through 3, including but not limited to server 160*a*, 160*b*, a virtual processor of a VM and/or hypervisor, and the like. Electronic system 400 may be or include a server, a personal computer or a mobile device such as a smartphone, tablet computer, laptop, PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 400 may include various types of computer readable media and interfaces for various other types of computer readable media. In the depicted example, electronic system 400 includes a bus 408, processing unit(s) 412, a system memory 404, a read-only memory (ROM) 410, a permanent storage device 402, an input device interface 414, an output device interface 406, and one or more network interfaces 416. In some implementations, electronic system 400 may include or be integrated with other computing devices or circuitry for operation of the various components and processes previously described.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process, in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, e.g., alphanumeric keyboards and pointing devices (also called "cursor control devices"). Output device interfaces 406 enables, e.g., the display of images generated by the electronic system 400. Output devices used with output device interface 406 include, e.g., printers and display devices, such as cathode ray tubes (CRT) or liquid crystal displays (LCD). Some implementations include devices such as a touchscreen that functions as both input and output devices.

Also, as shown in FIG. 4, bus 408 also couples electronic system 400 to a network (not shown) through network interfaces 416. Network interfaces 416 may include, e.g., a wireless access point (e.g., Bluetooth or WiFi) or radio circuitry for connecting to a wireless access point. Network interfaces 416 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 400 can be used in conjunction with the subject disclosure.

Each network connections disclosed herein may be a wired or wireless connection, such as by Ethernet, WiFi, BLUETOOTH, an integrated services digital network (ISDN) connection, a digital subscriber line (DSL) modem, or a cable modem. Direct or indirect network connection may be used, including, but not limited to a telephone modem, an MIB system, an RS232 interface, an auxiliary interface, an optical link, an infrared link, a radio frequency link, a microwave link, a personal area network connection, a local area network connection, a cellular link, or a WLANS connection or other wireless connection.

Enterprise devices incorporating aspects of the subject technology may be equipped with a network interface module (NIM), allowing each device to participate as a node in a network. While for purposes of clarity the subject technology will be described as operating in an Ethernet network environment using the Internet Protocol (IP), it is understood that concepts of the subject technology are equally applicable in other network environments, and such environments are intended to be within the scope of the subject technology.

Data to and from the various data sources can be converted into network-compatible data with existing technology, and movement of the information between the appliances and the network can be accomplished by a variety of means. For example, the appliances and network may communicate via automated interaction, manual interaction, or a combination of both automated and manual interaction. Automated interaction may be continuous or intermittent and may occur through direct network connection, or through RS232 links, MIB systems, RF links such as BLUETOOTH, IR links, PANS, LANS, WLANS, digital cable systems, telephone modems or other wired or wireless communication means. The communication means in various aspects may be bidirectional with access to data from as many points of the distributed data sources as possible. Decision-making can occur at a variety of places within the network.

These functions described above can be implemented in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to specifically configured electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

ILLUSTRATION OF SUBJECT TECHNOLOGY AS CLAUSES

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identification.

Clause 1. A method for enterprise authentication, comprising: receiving an enterprise key (EK) at a first appliance of a plurality of appliances; importing the EK into a virtual Trusted Platform Module (vTPM) associated with the first appliance; receiving, by the first appliance, after importing the EK, a user authentication request associated with a user; receiving, by the first appliance, a user encrypted key associated with the user, the user encrypted key being previously encrypted based on the EK by a vTPM associated with a second appliance of the plurality of appliances; causing the vTPM associated with the first appliance to sign a challenge based on decrypting the user encrypted key with the EK imported into the vTPM associated with the first appliance; receiving the signed challenge from the vTPM associated with the first appliance; and completing the user authentication request based on the received signed challenge from the vTPM associated with the first appliance.

Clause 2. The method of Clause 1, further comprising, by the second appliance before the user encrypted key is received by the first appliance: receiving the EK at the second appliance; importing the EK into a vTPM associated with the second appliance; causing the vTPM associated with the second appliance to generate the encrypted user key for the user based on the EK imported into the vTPM associated with the second appliance; and storing the encrypted user key in a database associated with the second appliance, wherein the database replicates the encrypted user key to a database associated with the first appliance.

Clause 3. The method of Clause 2, wherein the first appliance receiving the user encrypted key associated with the user comprises: the first appliance obtaining the user encrypted key from the database associated with the first appliance after the user encrypted key is replicated by the database associated with the second appliance.

Clause 4. The method of Clause 2, further comprising: generating a public key and a private key, wherein causing the vTPM associated with the second appliance to generate the encrypted user key comprises: importing the private key into the vTPM to be encrypted by the EK; and causing the vTPM to encrypt the private key with the EK.

Clause 5. The method of Clause 4, wherein completing the user authentication request comprises: verifying the signed challenge received from the vTPM associated with the first appliance.

Clause 6. The method of Clause 1, further comprising: receiving the EK at the plurality of appliances including the first appliance and the second appliance, each appliance associated with a respective vTPM; and importing, by each appliance of the plurality of appliances, the EK into the respective vTPM associated with the appliance.

Clause 7. The method of claim 1, wherein each appliance of the plurality of appliances comprises one or more virtual machines (VMs) running concurrently on a server computer, each VM being associated with a respective vTPM.

Clause 8. The method of Clause 7, wherein each respective vTPM executes in a protected memory space of a hypervisor associated with a corresponding VM, wherein the user encrypted key received at the first appliance is received via a VM of the first appliance, and causing the vTPM associated with the first appliance to sign the challenge comprises the VM of the first appliance sending instructions to the vTPM via the hypervisor.

Clause 9. The method of Clause 8, wherein each respective vTPM executes as logic in random-access memory while storing encrypted data, including the EK, in an encrypted file on a secure non-volatile memory associated with the hypervisor, wherein causing the vTPM associated with the first appliance to sign the challenge comprises the vTPM associated with the first appliance to read the EK from the secure non-volatile memory.

Clause 10. The method of Clause 1, wherein the EK is received by the plurality of appliances from an administration interface remote from the first appliance.

Clause 11. The method of Clause 10, further comprising: receiving, by the first appliance from the vTPM associated with the first appliance, when the EK is imported into the vTPM associated with the first appliance, an index to the EK within an address space of the vTPM associated with the first appliance.

Clause 12. The method of Clause 1, wherein the plurality of appliances comprises an enterprise cluster of servers.

Clause 13. A non-transitory machine readable medium storing instructions thereon that, when executed by one or more computing devices, performs a method according to any one of Clauses 1-12.

Clause 14. A system for enterprise authentication, comprising: the plurality of appliances, wherein the first appliance comprises a server configured to perform the method of Clause 1, and wherein the second appliance comprises a server configured to perform the method of any one of Clauses 2-15.

Clause 15. A method for enterprise authentication, comprising: receiving an enterprise key (EK) at a plurality of appliances, each appliance associated with a respective virtual Trusted Platform Module (vTPM); importing, by each appliance, the EK into the respective vTPM associated with the appliance; causing a vTPM of a first appliance to generate an encrypted user key for a user based on the EK; storing the encrypted user key in a first database associated with the first appliance, wherein the first database replicates the encrypted user key to a second database associated with the second appliance; receiving a user authentication request at a second appliance; obtaining the encrypted user key from the second database; causing a second vTPM associated with the second appliance to sign a challenge with the user encrypted key; and completing the user authentication request based on the signed challenge received from the second vTPM.

FURTHER CONSIDERATIONS

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples. A phrase such as an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A method for enterprise authentication, comprising:
   receiving an enterprise key (EK) at a first appliance of a plurality of appliances;
   importing the EK into a virtual Trusted Platform Module (vTPM) associated with the first appliance;

receiving, by the first appliance, after importing the EK, a user authentication request associated with a user;

receiving, by the first appliance, a user encrypted key associated with the user, the user encrypted key being previously encrypted based on the EK by a vTPM associated with a second appliance of the plurality of appliances;

causing the vTPM associated with the first appliance to sign a challenge based on decrypting the user encrypted key with the EK imported into the vTPM associated with the first appliance;

receiving the signed challenge from the vTPM associated with the first appliance; and completing the user authentication request based on the signed challenge received from the vTPM associated with the first appliance; and further comprising, by the second appliance before the user encrypted key is received by the first appliance:

receiving the EK at the second appliance;

importing the EK into a vTPM associated with the second appliance;

causing the vTPM associated with the second appliance to generate the encrypted user key for the user based on the EK imported into the vTPM associated with the second appliance; and storing the encrypted user key in a database associated with the second appliance, wherein the database replicates the encrypted user key to a database associated with the first appliance.

2. The method of claim 1, wherein the first appliance receiving the user encrypted key associated with the user comprises:

the first appliance obtaining the user encrypted key from the database associated with the first appliance after the user encrypted key is replicated by the database associated with the second appliance.

3. The method of claim 1, further comprising:

generating a public key and a private key, wherein causing the vTPM associated with the second appliance to generate the encrypted user key comprises:

importing the private key into the vTPM to be encrypted by the EK; and causing the vTPM to encrypt the private key with the EK.

4. The method of claim 3, wherein completing the user authentication request comprises:

verifying the signed challenge received from the vTPM associated with the first appliance with the public key.

5. The method of claim 1, further comprising:

receiving the EK at the plurality of appliances including the first appliance and the second appliance, each appliance associated with a respective vTPM; and importing, by each appliance of the plurality of appliances, the EK into the respective vTPM associated with the appliance.

6. The method of claim 1, wherein each appliance of the plurality of appliances comprises one or more virtual machines (VMs) running concurrently on a server computer, each VM being associated with a respective vTPM.

7. The method of claim 6, wherein each respective vTPM executes in a protected memory space of a hypervisor associated with a corresponding VM, wherein the user encrypted key received at the first appliance is received via a VM of the first appliance, and causing the vTPM associated with the first appliance to sign the challenge comprises the VM of the first appliance sending instructions to the vTPM via the hypervisor.

8. The method of claim 7, wherein each respective vTPM executes as logic in random-access memory while storing encrypted data, including the EK, in an encrypted file on a secure non-volatile memory associated with the hypervisor, wherein causing the vTPM associated with the first appliance to sign the challenge comprises the vTPM associated with the first appliance to read the EK from the secure non-volatile memory.

9. The method of claim 1, wherein the EK is received by the plurality of appliances from an administration interface remote from the first appliance.

10. The method of claim 9, further comprising:

receiving, by the first appliance from the vTPM associated with the first appliance, when the EK is imported into the vTPM associated with the first appliance, an index to the EK within an address space of the vTPM associated with the first appliance.

11. The method of claim 1, wherein the plurality of appliances comprises an enterprise cluster of servers.

12. A non-transitory machine readable medium storing instructions thereon that, when executed by one or more computing devices, performs a method according to claim 1.

13. A system for enterprise authentication, comprising:

a plurality of appliances, wherein a first appliance of the plurality of appliances comprises a server configured to:

receive an enterprise key (EK) at a first appliance of a plurality of appliances;

import the EK into a virtual Trusted Platform Module (vTPM) associated with the first appliance;

receive, by the first appliance, after importing the EK, a user authentication request associated with a user;

receive, by the first appliance, a user encrypted key associated with the user, the user encrypted key being previously encrypted based on the EK by a vTPM associated with a second appliance of the plurality of appliances;

cause the vTPM associated with the first appliance to sign a challenge based on decrypting the user encrypted key with the EK imported into the vTPM associated with the first appliance;

receive the signed challenge from the vTPM associated with the first appliance; and complete the user authentication request based on the signed challenge received from the vTPM associated with the first appliance; and wherein the second appliance comprises a server configured to:

receive the EK at the second appliance;

import the EK into a vTPM associated with the second appliance;

cause the vTPM associated with the second appliance to generate the encrypted user key for the user based on the EK imported into the vTPM associated with the second appliance; and store the encrypted user key in a database associated with the second appliance, wherein the database replicates the encrypted user key to a database associated with the first appliance; and wherein the second appliance before the user encrypted key is received by the first appliance is further configured to:

receive the EK at the second appliance;

import the EK into a vTPM associated with the second appliance;

cause the vTPM associated with the second appliance to generate the encrypted user key for the user based on the EK imported into the vTPM associated with the second appliance; and store the encrypted user key in a database associated with the second appliance, wherein the database replicates the encrypted user key to a database associated with the first appliance.

14. The system of claim 13, wherein the first appliance receiving the user encrypted key associated with the user comprises:

the first appliance obtaining the user encrypted key from the database associated with the first appliance after the user encrypted key is replicated by the database associated with the second appliance.

15. The system of claim 13, further comprising:

generating a public key and a private key, wherein causing the vTPM associated with the second appliance to generate the encrypted user key comprises:

importing the private key into the vTPM to be encrypted by the EK; and causing the vTPM to encrypt the private key with the EK.

16. The system of claim 15, wherein completing the user authentication request comprises:

verifying the signed challenge received from the vTPM associated with the first appliance with the public key.

17. The system of claim 13, further comprising:

receiving the EK at the plurality of appliances including the first appliance and the second appliance, each appliance associated with a respective vTPM; and importing, by each appliance of the plurality of appliances, the EK into the respective vTPM associated with the appliance.

18. The system of claim 13, wherein each appliance of the plurality of appliances comprises one or more virtual machines (VMs) running concurrently on a server computer, each VM being associated with a respective vTPM, and wherein each respective vTPM executes in a protected memory space of a hypervisor associated with a corresponding VM, wherein the user encrypted key received at the first appliance is received via a VM of the first appliance, and causing the vTPM associated with the first appliance to sign the challenge comprises the VM of the first appliance sending instructions to the vTPM via the hypervisor.

19. A method for enterprise authentication, comprising:

receiving an enterprise key (EK) at a plurality of appliances, each appliance associated with a respective virtual Trusted Platform Module (vTPM);

importing, by each appliance, the EK into the respective vTPM associated with the appliance;

causing a vTPM of a first appliance to generate an encrypted user key for a user based on the EK;

storing the encrypted user key in a first database associated with the first appliance, wherein the first database replicates the encrypted user key to a second database associated with a second appliance;

receiving a user authentication request at the second appliance;

obtaining the encrypted user key from the second database;

causing a second vTPM associated with the second appliance to sign a challenge with the user encrypted key; and completing the user authentication request based on the signed challenge received from the second vTPM; and further comprising, by the second appliance before the user encrypted key is received by the first appliance:

receiving the EK at the second appliance;

importing the EK into a vTPM associated with the second appliance;

causing the vTPM associated with the second appliance to generate the encrypted user key for the user based on the EK imported into the vTPM associated with the second appliance; and storing the encrypted user key in a database associated with the second appliance, wherein the database replicates the encrypted user key to a database associated with the first appliance.

\* \* \* \* \*